United States Patent [19]

Desgrandchamps et al.

[11] 3,714,286
[45] Jan. 30, 1973

[54] PROPYLENE DIMERIZATION PROCESS

[75] Inventors: Guy Desgrandchamps, Luxembourg; Henri Hemmer, Billere; Michel Haurie, Pau, all of France

[73] Assignee: Societe Anonyme dite: Societe Nationale des Petroles D'Aquitaine, Courbeuoie, France

[22] Filed: Jan. 13, 1970

[21] Appl. No.: 2,653

[30] Foreign Application Priority Data

Jan. 16, 1969  France................................6900607

[52] U.S. Cl. ......................260/683.15 D, 252/431 R
[51] Int. Cl.................................................C07c 3/10
[58] Field of Search............................260/683.15 D

[56] References Cited

UNITED STATES PATENTS 3,379,706   4/1968   Wilke .........................260/683.15 X
3,558,736   1/1971   Bergem et al. ..................260/683.15

Primary Examiner—Paul M. Coughlan, Jr.
Attorney—Milton J. Wayne

[57] ABSTRACT

A process for the dimerisation and codimerisation of olefines, consists in maintaining the olefine or olefines in an inert solvent in contact with a catalyst system comprising a complex formed by a halide of a transition metal of Group VIII, complexed with 1 to 6 molecules, per atom of transition metal, of an organic sulphoxide or disulphoxide, the complex being accompanied by an organoaluminium compound.

The process can be carried into effect in accordance with two variants: EITHER THE CATALYST IS PREPARED IN SITU, WHICH REQUIRES AN Al/transition metal atomic ratio which is between 3 and 9 to 1, or the catalyst is prepared ex situ (continuous process), which requires an Al/transition metal ratio greater than 9 to 1.

12 Claims, No Drawings

PROPYLENE DIMERIZATION PROCESS

The invention includes novel catalysts as defined above for the dimerisation and codimerisation of olefines.

This invention relates to the dimerisation and codimerisation of olefines.

It is one object of the invention to provide an improved process for the dimerisation or codimerisation, in liquid phase, of olefines, particularly lower olefines, that is olefines having two, three or four carbon atoms.

Another object is to provide such a process for the dimerisation of propylene, with the object of obtaining a product which is rich in methyl pentenes.

A still further object of the invention to provide novel catalysts which are suitable for use in the dimerisation or codimerisation of olefines.

The dimerisation of lower alpha-olefines represents an important industrial problem, to which considerable research has been applied in recent years. Its principle object is the production of $C_4$ and $C_6$ olefines, the subsequent pyrolysis of which yields dienes which are in great demand for the manufacture of elastomers; this is particularly the case with isoprene and butadiene, which are obtained from methyl pentenes and butenes. A basic problem in this technique has been to find suitable catalysts, especially ones which will enable the lower alpha-olefines to be dimerised in solution with a good selectivity as regards the desired dimers, including particularly the dimerisation of ethylene into butenes and that of propylene into hexenes.

Despite the number and the variety of the compounds which have so far been tried or used the problem still calls for improvements, because each of the types of catalysts tried had certain defects, as well as advantages.

The present invention provides a number of useful improvements. These include particularly the provision and use of catalysts which are easy to prepare and the optimum degree of activity of which is found at the temperatures which can be most easily regulated, that is to say at, or not far from, 0° C. It is known that, because of the latent heat of fusion of ice, it is at 0° C., or close to this temperature, that it is easiest to keep constant the temperature of the medium in an exothermic reaction. It is also in this region near 0° C. that the catalysts of the present invention have been found to have good selectivities for the dimers, relatively to the higher oligomers, as compared with those of the prior art. These selectivities can exceed 95 percent, this being obtained for a practically quantitative conversion.

Because of the temperature at which the operation takes place, the dimers contain a high proportion of 2-methyl-pent-2-ene, which is particularly required for the preparation of isoprene. The amount can be more than 70 percent in the dimer which is obtained.

The productivity can exceed 200 kg/g of nickel per hour for operations carried out continuously, when nickel is the transition metal of the catalyst used.

The new catalyst according to the invention is characterized in that it comprises a complex formed by a halide of a transition metal of Group VIII of the Periodic Table, complexed with from 1 to 6 molecules, per atom of transition metal, of an organic sulphoxide or disulphoxide, this complex being accompanied by an organoaluminum compound, preferably an alkyl aluminum halide.

The sulphoxide complex of the transition metal in the catalyst of the invention can be represented by formulas of the type $MX_2p(R_1(SO)_nR_2)$ or $MX_2p(R_1SOR_2 SOR_3)$, in which M is a transition metal of Group VIII, the preferred metals being iron, cobalt, nickel and copper, and particularly nickel, while X is a halogen, particularly chlorine, bromine or iodine, and $p$ is from 1 to 6. The number of sulphoxide molecules which can be complexed to $MX_2$ depends on the conditions under which the complex is prepared. Thus $n$ may be 1 or 2 and $R_1$, $R_2$ and $R_3$ can be alkyl, cycloalkyl or aryl groups and they may be the same or different.

Sulphoxides which are particularly suitable for the preparation of the catalysts of the present invention include dicyclohexyl sulphoxide, diphenyl sulphoxide, dimethyl-1,2-dhioethane oxide

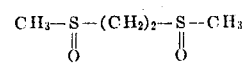

but other sulphoxides may also be used.

According to one preferred feature of the invention, the speed of activation of the catalysts and, as a result, the speed of reaction can be improved, without the selectivity being lowered, by adding a small quantity of water to the catalyst system. This quantity should, for best results, be between the very strict limits of 0 to 2 moles of $H_2O$ per mole of nickel complex, because beyond these limits, the water has a harmful effect, causing a fall in the selectivity rate.

Sulphoxide complexes based on transition metals, particularly nickel, can be easily prepared by the methods described in the following examples.

It is interesting to find that the very good results which are obtained using the process of this invention, as regards the degree of conversion, the dimer selectivity relatively to the oligomers formed and the reaction time, only occur when the catalyst contains a transition metal halide complexed with an organic sulphoxide as defined above. If the inclusion of this complex in the reaction medium is replaced by the sole addition of the transition metal halide and an organoaluminum compound, the reaction is much slower than with the complex.

For example, if the transition metal halide is nickel chloride, 24 minutes are needed, in the presence of 6 molecules of water, to obtain a conversion of 90 percent. The proportion of higher oligomers relatively to the dimers is large.

If the addition of the complex of the present invention into the reaction medium is replaced by the simultaneous addition of nickel chloride and diphenyl sulphoxide, there is obtained an improvement in the dimer selectivity, but the reaction time has always been found to be from 30 to 40 minutes, that is to say more than 10 or 20 times slower than with a catalyst according to the invention.

On the other hand, to use a catalyst formed by the simultaneous addition of nickel chloride and sulphoxide (without the addition of water), it would be necessary to allow from 100 to 200 minutes to obtain a conversion rate of only 50 percent.

The organic aluminum compounds which are suitable for carrying the invention into effect, concurrently with the nickel complexes as indicated above, can in general be similar to those which have previously been used by themselves. They include particularly compounds of the general formulas $R_2AlX$, $RAlX_2$ and $R_3Al_2X_3$. The radical R is generally an alkyl; alkyls such as ethyl, propyl, isopropyl, butyl or isobutyl are particularly suitable. The halogen X is generally chlorine and/or bromine.

Although the proportion of the organoaluminum compounds can vary relatively to that of the nickel complex within limits which are between 3 and 100 to 1, it is preferable for the Al/transition metal atomic ratio in the catalyst systems to be between 6 and 12 and better still between 7 and 9 to 1, when the catalyst is prepared in situ, that is to say, when the sulphoxide complex of the transition metal, the solvent, the organic aluminum compound and the olefine are introduced simultaneously into the autoclave. On the other hand, it is preferable for this ratio to be higher than 9 to 1 and for it preferably to be between 15 and 50 and, even better, between 20 and 30 to 1 when the catalyst is prepared ex situ, that is to say, before it is brought into contact with the olefine which is to be dimerized. It is within these limits that the best selectivity is obtained.

For a catalyst prepared in situ, the quantity of catalyst can be such that the weight of the transition metal of the complex being employed represents 0.05g to 5g, in the case of nickel, per kg of olefines subjected to the dimerization. Excellent results are obtained with nickel contents from 0.1g to 1g of nickel per kg of olefine. In the case of a catalyst prepared ex situ, this nickel content is preferably form 0.005g to 1g; excellent results are obtained with contents from 0.001g to 0.5g.

The dimerization according to the process of the invention can be carried out at temperatures of from −50° to +80° C., but the most practical results are obtained between −5° and +10° C. Very good results, with conversions are practically 100 percent, are obtained at 0° C. Since it is this temperature which, for the reason referred to above, is the easiest to keep constant, it represents the temperature which is by far the preferred temperature for carrying out the present invention.

The solvents suitable for the dimerization which has been described are the liquids which are neutral with respect to the catalysts and include particularly the optionally halogenated saturated hydrocarbons, the aromatic or halogenated aromatic hydrocarbons; aliphatic or aromatic or cyclic ethers which are not reactive as regards the catalysts can also be used.

The usual solvents known in the art are generally suitable. It is thus possible, for example, to use toluene, xylene, chlorobenzenes, chloronaphthalenes. Halogenated aromatic solvents are preferred because they lead to high reaction speeds and because of the better solubility in them of the catalyst system. Liquid propylene can also serve as a solvent as well as forming the dimers produced in the reaction.

It is advisable to select a solvent which has a fairly high boiling point and a sufficiently low solidification point so that the dimers formed can easily be separated after the reaction without there being any fear of solidification at the low temperatures at which the dimerization takes place. Consequently, according to one of the features of the invention, the solvent being used is preferably a monohalonaphthalene or dihalonaphthalene, and more particularly alpha-chloronaphthalene, the boiling point of which is 259° C. with a solidification point of −20° C.

The process of the invention can be carried into effect in accordance with either of two variants. It is possible to use either a process in situ, that is to say, to introduce the catalyst, solvent, organic aluminum compound and olefine simultaneously into the reactor, or an ex situ process, which permits of continuous operation.

The operating procedure according to the first variant of the invention involves effecting the dimerization or codimerization of the olefines in an in situ process.

In the following Examples 4 to 13, there will be described test carried out in a stainless steel autoclave with a capacity of 125 ml, equipped with a double jacket for cooling purposes. A specified quantity of the nickel sulphoxide complex was introduced into the autoclave in an atmosphere of nitrogen. A certain volume of alpha-cloronaphthalene and a specified quantity of ethyl aluminum sesquichloride $Al_2Et_3Cl_3$ were then injected. A given weight of liquid propylene was condensed in the autoclave, which was cooled to 0° C.

The drop in the pressure of the propylene in the autoclave, due to the dimerization continued until from 90 to 100 percent of the propylene had disappeared. At the end of the reaction, the catalyst was deactivated by adding 10 ml of water. The organic phase was extracted and subjected to distillation. The conversion of the initial propylene and the composition of the formed products were established, this enabling the selectivity of dimers relatively to the upper oligomers to be expressed.

The operating procedure in accordance with the second variant of the invention enables conversion rates and selectivities to be obtained which are as good as in the in situ process. It involves preparing the activated catalyst before it is brought into contact with the olefine. This process, which permits of continuous operation, has a certain number of other advantages; it is based on a number of observations made by the inventors. The authors of the present invention have in fact observed that when the catalyst is prepared ex situ, that is to say, before it is brought into contact with the olefine which is to be dimerized the Al/transition metal atomic ratios which are necessary for obtaining the best results are different from those which are necessary for obtaining the same results when the catalyst is prepared in situ. The value of this ratio has to be appreciably increased; the quantity of nickel necessary for the dimerization of olefines is much less than that used in the process carried out in situ. From an economic point of view, this constitutes a great advantage, when the high cost of the nickel is taken into account.

The process in accordance with this second variant involves preparing a catalyst of the formula $MX_2pR_1(SO)_nR_2$ or $MX_2p(R_1SOR_2SOR_3)$, activating this with an organoaluminum compound, so that the transition metal and aluminum elements are in an atomic ratio equal to or greater than 9 to 1 and in using this catalyst under conditions in which it has been prepared before being used with the olefine or olefines to be dimerized.

The nickel complexes as described above are not directly active in this form. For making these complexes active, the transition metal (preferably nickel) has to be reduced to a lower valency state by means of the organoaluminum compound. The inventors of the present invention have found that the activation of the sulphoxide complex by the organoaluminum compounds is not instantaneous, but that it can last from 10 to 30 minutes.

Thus, when operating by bringing the nickel complex, organoaluminum compound, solvent and propylene simultaneously into the reactor, the active form of the catalyst is only gradually liberated. The quantity of nickel which has actually participated in the catalysis is much smaller than the quantity engaged in the complex.

In the presence of the active complex, the reaction can be extremely rapid and even violent; it can be of the order of 2 to 3 minutes. When using the in situ process, the quantity of transition metal introduced into the catalyst is chosen so that the organoaluminum compound liberates, in 2 or 3 minutes, the quantity of active complex necessary for the reaction. Since the activating reaction lasts from 10 to 30 minutes, it can be seen that the quantity of transition metal in the catalyst is about 5 to 15 times larger than that which has actually served for the reaction.

The reaction time is, in part, a function of the quantity of nickel which is present. However, there is no advantage in this nickel content being too large, because a very rapid reaction is also very violent and there is a danger of a certain quantity of the nickel not being used. It is preferable to select quantities of nickel for which the productivity is best. The quantity of catalyst can be such that the weight of transition metal of the complex employed represents 0.005g to 1g, in the case of nickel, per kg of olefine being subjected to the dimerization or codimerization excellent results are obtained with nickel contents of from 0.01g to 0.5g.

For preparing such a catalyst, the inactive complex and the organoaluminum halide are brought together in suspension in a solvent.

The sulphoxide complex is insoluble in the solvents which are particularly suitable for the dimerization A homogeneous solution is only obtained after these complexes have been activated with the organoaluminum halide. For obtaining an efficient catalyst, it is necessary for this activation to be effected in the presence of a protecting olefine. It is thought that this olefine, by being coordinated with the nickel atom of the active complex, stabilizes the latter and prevents its decomposition into metallic nickel.

A number of olefines can be used with advantage to this end, but a particular preference, as regards the preparation of the catalyst, is given to the use of propylene dimers. This use avoids the introduction of a supplementary compound which is foreign to the reaction and which it would subsequently be necessary to separate out. However, as the active complex is only sparingly soluble in these solvents, it is necessary to work in the presence of a more or less large quantity of this solvent, which will permit the obtaining of catalyst solutions which are not too dilute.

One preferred solvent is formed, for example, of one-third of propylene dimers and two-thirds of chlorobenzene. The quantity of complex which can be dissolved in this solvent corresponds to approximately 1 to 3 milliatoms of nickel per liter.

It is important that the activating reaction and also the preservation of the activated catalyst should occur in an inert atmosphere, for example argon, because the catalyst solutions are extremely sensitive to the oxygen of the air (which causes the precipitation of the metallic nickel) and to humidity (which hydrolyzes the active complex). The activation of the sulphoxide complex can be followed qualitatively by the change in color, the inactive form being blue and the homogeneous active solution being yellow.

The activation of the catalyst complex can be effected at different temperatures which may extend from $-30°$ to $+20°$ C. The activation speed increases with the temperature. However, for the sake of good preservation of the catalyst, it is preferable to work at a low temperature. By way of example for a temperature of $-20°$ C., the time required for activation can reach a few hours. The time is only a few tens of minutes when the activation is effected at $-10°$ C. and it is only a few minutes for a temperature of $0°$ C.

When the active catalyst solution has been prepared, it is preserved at a low temperature in an argon atmosphere. The stability of this solution enables it to be kept for several days. Nevertheless, it is preferred to use it in the few hours which follow its preparation and, better still, during the first hour. During the operation of dimerizing or codimerization the olefines, the withdrawal of this solution and its introduction into the reactor have to be carried out protected from air. The olefine to be dimerized or codimerized is then injected, at a constant pressure, into the cooled reactor.

The examples which follow illustrate certain forms of the invention, without however limiting it.

EXAMPLE 1

Preparation of the $NiCl_2p(C_6H_{11})_2SO$ complex.

1g of $NiCl_2 \cdot 6H_2O$ is suspended in 80 ml of 2,2'-methoxypropane; heating takes place in a nitrogen atmosphere at $35°$ C. for 2 hours. A yellowish precipitate is obtained, corresponding to 0.04 mole of anhydrous $NiCl_2$. The supernatant liquid is distilled and the anhydrous $NiCl_2$, placed in suspension in 2,2-dimethoxypropane, is treated with a very large excess of dicyclohexyl sulphoxide in solution in benzene. The precipitate which is formed is heated under reflux in the suspension for 12 hours. The complex is filtered, washed 3 times with anhydrous ether and dried under vacuum.

This complex has an infra-red spectrum which is characterized by the line at $980^{cm-1}$, which corresponds to that of the SO group coordinated with oxygen to the transition metal. One of the infra-red lines of $(C_6H_{11})_2SO$ is $1,030-1,020^{cm-1}$, corresponding to the free SO group.

EXAMPLE 2

Preparation of the $NiCl_2p(C_6H_5)_2SO$ complex.

1.5 g (0.01 mole) of anhydrous $NiCl_2$ and 7.5 g (0.03 mole) of $(C_6H_5)_2SO$ are introduced into a spherical flask. This is heated for 2 hours at $80°$ C., this being a temperature slightly higher than the melting point of $(C_6H_5)_2SO$; a green solution is obtained, which is filtered hot in order to eliminate any $NiCl_2$ which has not reacted; 25 ml of benzene are added; a precipitate is formed, which is filtered, washed with benzene and with anhydrous ether, and dried under vacuum. As in the preceding example, this complex has an infra-red spectrum characterized by the line at 980$^{cm-1}$.

EXAMPLE 3

Preparation of the

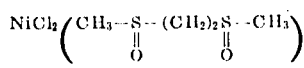

complex.

This preparation is described in the Journal of the South African Chemical Institute, volume XXI-8-1 968.

Anhydrous NiCl$_2$, suspended in a nitromethane, is added to a hot solution of nitromethane containing an excess of $$CH_3-\underset{\underset{O}{\|}}{S}-(CH_2)_2-\underset{\underset{O}{\|}}{S}-CH_3$$

This mixture is allowed to react between 95° and 100°C for 1 hour. Green crystals of

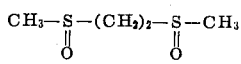

precipitate by cooling.

Like the foregoing, these crystals have an infra-red spectrum, characterized by the line at 980$^{cm-1}$.

EXAMPLE 4

Process in which the catalyst is prepared in situ (Variant 1)

The catalyst comprises 810 mg of the NiCl$_2$p(C$_6$H$_{11}$)$_2$SO complex and 7.5 × 10$^{-3}$ moles of ethyl aluminum sesquichloride. The quantity of alpha-chloronaphthalene is 15 ml and that of the added liquid propylene is 30.6g. After one minute, 94 percent of the propylene is transformed into 28.7g Of liquid oligomers, from which 20.6g of C$_6$ dimers are isolated, with a selectivity of 72 percent. The dimers which are obtained are composed of 74.2 percent of methyl pentenes, 20.2 percent of hexenes and 5.6 percent of dimethyl butenes.

EXAMPLE 5

Using the NiCl$_2$p(C$_6$H$_5$)$_2$SO complex, 5.15 mg of it are employed, together with 5 × 10$^{-3}$ moles of Al$_2$Et$_3$Cl$_3$. The solvent is constituted by 10 ml of alpha-chloronaphthalene. 30.6g Of liquid propylene are added. After 2.30 minutes at 0°C the quantity of liquid oligomers obtained is 29.5g, which corresponds to a conversion of 96.5. The quantity of dimers recovered is 26.5g, with a selectivity of 90%. These dimers are composed of 75.2 percent of methyl pentenes, 22.4 percent of hexenes and 2.4 percent of dimethyl butenes.

EXAMPLE 6

In an operation similar to that of Examples 4 and 5, 0.7 × 10$^{-3}$ moles of

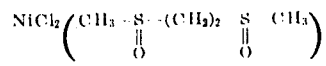

5.10$^{-3}$ moles of (Al$_2$Et$_3$Cl$_3$) (the Al/Ni ratio of which is 7 to 1) and 10 ml of chlorobenzene are used. 30.6g of liquid propylene are added. After 3.30 minutes the conversion of the propylene into liquid oligomers is total. The quantity of dimers recovered is then 25.4g with a selectivity of 83 percent. These dimers are composed of 72.5 percent of methyl pentenes, 23.8 percent of hexenes and 3.7 percent of dimethyl butenes.

EXAMPLE 7

Operations identical with those of Example 5, are carried out at different temperatures. Their results given together, are as follows:

| Temp., °C. | Time | Conversion, percent | Selectivity, percent | Hexenes | Methyl pentenes | Dimethyl butenes |
|---|---|---|---|---|---|---|
| −20 | 60 hrs | 78 | 90 | 14.3 | 85.7 |  |
|  | 30 hrs | 67 | 92 | 14.4 | 85.6 |  |
| 0 | 3 hrs | 98 | 85 | 24.1 | 72.6 | 3.3 |
|  | 2.30 min | 96.5 | 90 | 22.4 | 75.2 | 2.4 |
| +10 | 1.20 min | 93 | 81.5 | 28.5 | 66.7 | 4.8 |

These examples show that an increase in temperature favors the conversion of the propylene, but to the detriment of the selectivity.

EXAMPLE 8

In operations similar to those of Example 5, the

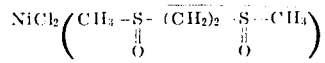

complex is replaced either by the addition of hydrated NiCl$_2$ by itself or by the simultaneous addition of NiCl$_2$ and disulphoxide or by the simultaneous addition of NiCl$_2$H$_2$O and sulphoxide.

The following results are obtained:

| Catalyst | Time | Conversion % | Selectivity % |
|---|---|---|---|
| NiCl$_2$+3(disulphoxide) | 102 hrs | 50 | 82 |
| NiCl$_2$+(disulphoxide) | 180 hrs | 50 | 89 |
| NiCl$_2$·6H$_2$O | 24 hrs | 90 | 76 |
| NiCl$_2$·6H$_2$O+3(disulphoxide) | 30 hrs | 92 | 92 |

EXAMPLES 9 TO 13

The following Examples are intended to illustrate the influence of the presence of small quantities of water in the catalyst. The operations are carried out under the same conditions as those of Example 5; the number of molecules of water per molecule of complex is indicated in the Table. In order to be able to appreciate better the influence of the presence of water on the reaction time, 90g of propylene were used, instead of 30g.

| Example No | Mol of H$_2$O per mole of complex | Time | Conversion % | Selectivity % |
|---|---|---|---|---|
| 9 | 0 | 32 hrs | 98 | 90 |
| 10 | 1 | 25 hrs | 95 | 89.5 |
| 11 | 2 | 15 hrs | 94 | 88.5 |
| 12 | 3 | 9 hrs | 92 | 85 |
| 13 | 4 | 5 hrs | 91 | 84 |

The above shows that the addition of water reduces the time of reaction, without it reducing the selectivity, provided that not more than 2 moles of H$_2$O per mole of complex nickel are added.

EXAMPLE 14

Process in which the catalyst is prepared ex situ (variant 2)

Preparation of an active catalyst solution 0.515g of the NiCl$_2$p(C$_6$H$_5$)$_2$SO complex are introduced under a purified argon atmosphere into a three-necked spherical flask. The complex is suspended while stirring in 800 ml of a solvent, which is formed of one-third of propylene dimers and two-thirds of chlorobenzene, and is carefully dried and distilled under argon. The reactor is kept at a temperature of 0° C. and 20 × 10$^{-3}$ moles of Al$_2$Et$_3$Cl$_3$ are added dropwise.

The activation is followed quantitatively by the change in color of the solution, which changes from blue to yellow. This catalyst solution is kept under argon at 0° C. until the moment when it is used.

EXAMPLE 15

Dimerisation

Into a 250 ml stainless steel autoclave, kept at 0° C. by circulation of a thermostatically controlled liquid through a double jacket, there are introduced under an argon atmosphere 40 ml of the previously prepared active catalyst solution. 30.6 g of propylene are added; the temperature is kept at 0° C. The initial pressure is 5 bars. The decrease in pressure permits the advance of the reaction to be followed. When the pressure falls to 0, the reaction is terminated. Then 10 ml of water are added to deactivate the catalyst. The organic phase is separated and distilled. The conversion of the propylene is then complete. The selectivity is calculated according to the dimers collected. The quantity of collected dimers is 25.9g, which gives a selectivity of 88 percent. These dimers are composed of 75 percent of methyl pentenes, 23 percent of hexenes and 2 percent of dimethyl butenes.

We claim:

1. A process for the dimerization of propylene which comprises maintaining said propylene in an inert solvent in contact with a catalyst system at a temperature of from −50° to +80° C. to effect dimerization wherein said catalyst system includes from 0 to 2 moles of water per mole of a complex metal selected from the group consisting of MX$_2$p(R(SO)$_n$R) and

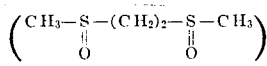

in which M is a metal selected from the group consisting of iron, cobalt, nickel, and copper; X is halogen; $p$ is an integer from 1 to 6; n is 1 or 2; and R is a member selected from the group consisting of alkyl, cycloalkyl and aryl, and an organoaluminum compound.

2. A process according to claim 1, wherein the catalyst is prepared by introducing simultaneously the sulphoxide complex of said metal, said solvent and an organoaluminum compound and said propylene into a reaction vessel where said dimerization is being effected and the atomic ratio between the aluminum and said metal present in the catalyst is from 6 to 12.

3. A process according to claim 1, wherein said metal is nickel and the quantity of catalyst used corresponds to 0.05g to 5g of nickel per kg of propylene being dimerized.

4. A process according to claim 1, wherein the catalyst is prepared by treating a sulphoxide complex of said metal and an organoaluminum compound and the atomic ratio between the aluminum and said metal present in the catalyst is in excess of 9 up to 50.

5. A process according to claim 4, wherein the catalyst system contains from 1 to 3 milliatoms of said metal per liter.

6. A process according to claim 4, wherein the catalyst system contains from 1 to 3 milliatoms of said metal per liter, wherein the said metal is nickel and wherein the quantity of catalyst used corresponds to 0.005g to 1g of nickel per kg of olefine being dimerized or codimerized.

7. A process according to claim 1, wherein the said metal is nickel.

8. A process according to claim 1 wherein the dimerization reaction is effected in a halogenated aromatic hydrocarbon solvent.

9. A process according to claim 2, wherein the atomic ratio between the aluminum and said metal present in the catalyst is from 7 to 9.

10. A process according to claim 3, wherein the quantity of catalyst used corresponds to 0.1g to 1g of nickel per kg of propylene.

11. A process according to claim 4, wherein the atomic ratio between the aluminum and said metal present in the catalyst is between 15 and 50.

12. A process according to claim 1 wherein the catalyst system is prepared in a halogenated aromatic hydrocarbon solvent.

* * * * *